July 2, 1968  H. JANSSON  3,390,499

MOUNTING FRAME OF SHEET METAL

Filed July 7, 1966

INVENTOR:
HENRY JANSSON
BY Howson & Howson
ATTYS.

United States Patent Office 3,390,499
Patented July 2, 1968

3,390,499
MOUNTING FRAME OF SHEET METAL
Henry Jansson, Jonkoping, Sweden, assignor to Aktiebolaget Svenska Flaktfabriken, Stockholm, Sweden
Filed July 7, 1966, Ser. No. 563,432
Claims priority, application Sweden, July 8, 1965,
9,002/65
3 Claims. (Cl. 52—302)

ABSTRACT OF THE DISCLOSURE

For mounting a duct socket into a rectangular surface opening, a mounting frame having a rectangular plate with a circular central opening adapted to be mounted flush with the finished surface by an inward extension fitted in the rectangular opening and outwardly projecting flanges embedded in the marginal portion of the rectangular opening during the fabrication of the surface. The duct socket comprises a cylindrical sleeve of a diameter corresponding to the diameter of the circular opening for insertion thereinto after completion of fabrication of the surface. Outwardly of the plate the sleeve has an outwardly projecting continuous bead therearound which bears against the plate in the marginal area of the circular opening and the inner terminus of the sleeve is of deformable material and is bent outwardly manually at a plurality of points spaced-apart equally about the circumference of the sleeve.

---

This invention relates to a mounting frame for connecting fans or ventilation ducts to openings in roofs, walls and floors.

In passages, for example through walls, heretofore an annular iron ring was used for the encasing. The ring was provided with flanges with bolt holes whereafter the ventilation ducts were connected to the flanges. This system includes several disadvantages.

In connection with the encasing for fixing the annular iron ring in a wall erected of square or rectangular building elements, first a square opening of sufficient size has to be made whereafter the ring can be embedded. The flange, however, because it is fired to the ring, projects from the wall plane and, thus, renders the plastering of the wall difficult. Besides, in order to prevent complicated and tedious mounting of joint pieces, the dimensions of the ventilation ducts must agree with the flanges of the ring. Hereby, the dimensioning of the ventilation ducts and of the system is interlocked in a troublesome manner.

The present invention has as its object to eliminate these disadvantages and is characterized in that the frame consists of a square or rectangular flanged plate having a central circular opening wherein a socket is mounted having one end inserted in the circular opening of the frame to an annular bead on said socket and that said socket is retained and fixed to the frame by bending the tube end about the edge of the circular opening in a plurality of points spaced equally around the periphery.

Figure 1:
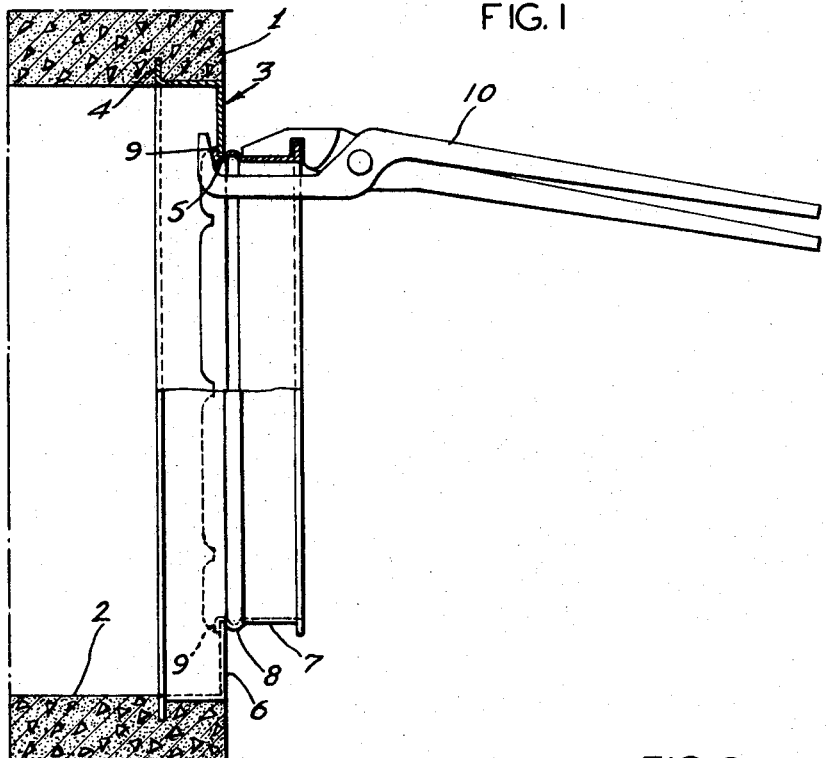
Figure 2:
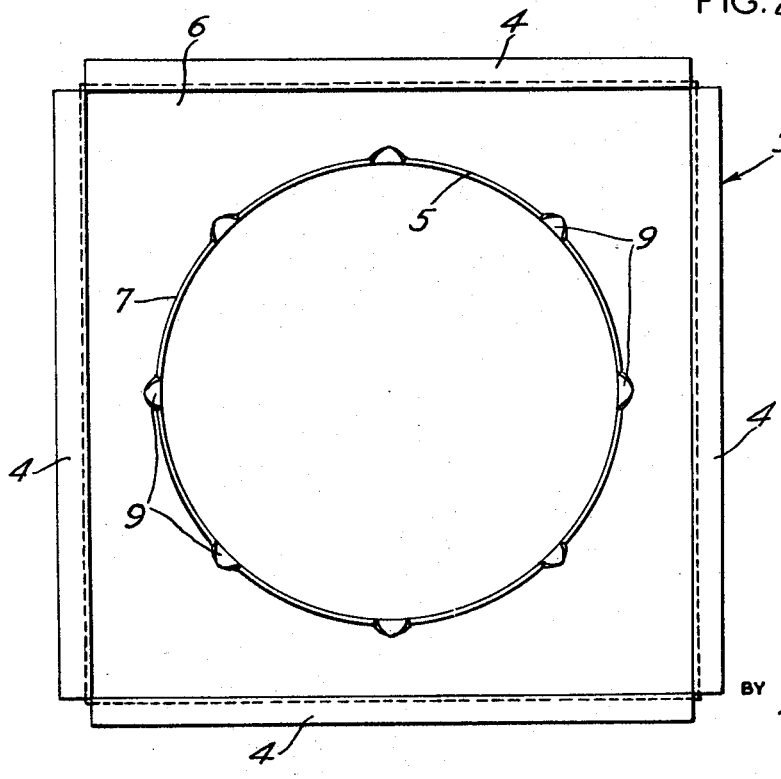

The invention will now be described in a greater detail in the following, reference being had to the accompanying drawing wherein FIG. 1 shows a side view of a section through a wall wherein a mounting frame is attached and a socket is inserted in the opening in the frame, and of a bending tool, and FIG. 2 shows a horizontal view of the frame seen from the inside of the opening in the wall.

In a square opening 2 in the wall 1 a mounting frame 3 is fixed. The frame is provided with a flange 4 engaging in the wall and holding the frame in place. The frame, as appears from FIG. 2, consists of a square plate having a circular opening in the side surface 6 coinciding with the plane of the wall. Into the said circular opening a socket 7 is inserted to an annular bead 8. The socket is secured at the frame by bending the tube end 9 about the edge 5 of the circular opening in a plurality of points spaced equally around the periphery. The bending is preferably carried out with a special tool 10.

The invention is, of course, not restricted to the above described embodiment, but may be modified within the scope of the inventive idea.

What I claim is:

1. Apparatus for connecting a tubular cylindrical member in a rectangular opening in one surface of a room structure comprising a mounting frame adapted to be mounted within said rectangular opening during fabrication of said room surface, and a cylindrical tubular socket adapted to be secured to said frame after fabrication of said room surface, said frame comprising a plate having a central circular opening receiving said socket and a rectangular outline conforming to said rectangular opening, said plate having an inward extension with outturned flanges embedded in the room-structure surrounding said rectangular openings mounting said plate coplanar with said room surface, said tubular socket having an annular bead extending continuously therearound abutted against said plate one one side thereof and having a plurality of outwardly offset portions at equally spaced locations therearound to bear against said plate on the other side thereof to rigidly mount said socket in said plate.

2. A method for connecting a tubular cylindrical member in a rectangular opening in one surface of a room structure comprising the steps of inserting a mounting frame within said rectangular opening during fabrication of said room surface, and securing a cylindrical tubular socket to said frame after fabrication of said room surface, said frame comprising a plate having a central circular opening for receiving said socket and a rectangular outline conforming to said rectangular opening, said plate having an inward extension with outturned flanges;

said inserting step comprising embedding said flanges in the room structure surrounding said rectangular opening to mount said plate coplanar with said room surface during fabrication of said room structure, said tubular socket having an annular bead extending continuously therearound, said securing step comprising inserting said socket in said circular opening after fabrication of said room structure and abutting said bead against said plate on one side thereof, and manually offsetting the end of said socket outwardly at a plurality of equally spaced locations therearound to bear against said plate on the other side thereof to rigidly mount said socket in said plate.

3. A method according to claim 2 wherein said bending operation is performed by a tool which is manually operated to offset the inner edge of said socket at a plurality of separate spaced-apart points about the periphery of the circular opening.

References Cited

UNITED STATES PATENTS

| | | | |
|---|---|---|---|
| 482,808 | 9/1892 | McGoron | 285—382 |
| 687,556 | 11/1901 | Carter | 285—189 X |
| 1,711,291 | 4/1929 | Strama | 285—382 X |
| 1,771,176 | 7/1930 | Holub | 285—176 |
| 2,198,535 | 4/1940 | James | 285—177 X |
| 2,461,100 | 2/1949 | White | 285—176 |
| 2,799,518 | 7/1957 | Anderson et al. | 285—424 X |
| 2,965,397 | 12/1960 | Vanden Berg | 285—189 |

CARL W. TOMLIN, *Primary Examiner.*

R. G. BERKLEY, *Assistant Examiner.*